(12) United States Patent
Russell et al.

(10) Patent No.: US 8,085,459 B1
(45) Date of Patent: Dec. 27, 2011

(54) PLASMONIC TRANSISTOR

(75) Inventors: Stephen D. Russell, San Diego, CA (US); Joanna N. Ptasinski, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 176 days.

(21) Appl. No.: 12/424,164

(22) Filed: Apr. 15, 2009

(51) Int. Cl.
*G02F 1/03* (2006.01)
*G02F 1/29* (2006.01)
*G02F 1/00* (2006.01)

(52) U.S. Cl. ........ 359/245; 359/315; 359/318; 359/321; 359/322

(58) Field of Classification Search .................. 359/245, 359/247, 254, 315, 318, 321, 322
See application file for complete search history.

(56) References Cited

U.S. PATENT DOCUMENTS

| | | | |
|---|---|---|---|
| 6,384,953 B1 | 5/2002 | Shimabukuro et al. |
| 6,646,782 B1 | 11/2003 | Russell et al. |
| 6,738,194 B1 | 5/2004 | Ramirez et al. |
| 6,753,994 B1 | 6/2004 | Russell et al. |

*Primary Examiner* — Jack Dinh
(74) *Attorney, Agent, or Firm* — Kyle Eppele; Arthur K. Samora

(57) ABSTRACT

A plasmonic transistor device includes an electro-optic substrate and a conductive layer placed on said electro-optic substrate to establish an interface therebetween. The first conductive layer and electro-optics substrate are made of materials that are suitable for transmission of a surface plasmon along the interface. The conductive layer is further formed with a source input grating and a drain output grating, for establishing the surface plasmon. A means for varying the electro-optic substrate permittivity, such as a light source or voltage source, is connected to the electro-optic substrate. Selective manipulation of the varying means allows the user to selectively increase or decrease the substrate permittivity. Control of the substrate permittivity further allows the user to control surface plasmon propagation from the source input grating along the interface to a drain output grating, to achieve a transistor-like effect for the surface plasmon.

17 Claims, 4 Drawing Sheets

PLASMONIC TRANSISTOR

FEDERALLY-SPONSORED RESEARCH AND DEVELOPMENT

This invention (Navy Case No. 098666) is assigned to the United States Government and is available for licensing for commercial purposes. Licensing and technical inquires may be directed to the Office of Research and Technical Applications, Space and Naval Warfare Systems Center, Pacific, Code 2112, San Diego, Calif. 92152; voice (619) 553-2778; email T2@spawar.navy.mil.

FIELD OF THE INVENTION

The present invention pertains generally to opto-electronic devices. More particularly, the present invention pertains to active opto-electronic devices that manipulate surface plasmon phenomena to exhibit a transistor-like effect for the surface plasmon.

BACKGROUND OF THE INVENTION

Plasmons are quasiparticles resulting from the quantization of plasma oscillations, just as photons and phonons are quantizations of light and sound waves, respectively. Surface plasmons are those plasmons that are confined to surfaces and that interact strongly with light. They occur at the interface of a vacuum or material with a positive dielectric constant with that of a negative dielectric constant (usually a highly conductive material such as a conductive or doped dielectric).

Plasmonics is a field where one exploits the short wavelength of a surface plasmon in an analogous method as one exploits an optical wavelength for information transfer or data manipulation. But, rather than a quantum of light (a photon), a plasmon or collective excitation in the electron density is used.

Plasmons have also been proposed as a means of high-resolution lithography and microscopy due to their extremely small wavelengths. Both of these applications have seen successful demonstrations in the lab environment. Finally, surface plasmons have the unique capacity to confine light to very small dimensions which could enable many new applications.

Additionally, plasmons have been considered as a means of transmitting information on computer chips, since plasmons can support much higher frequencies (into the 100 THz range, while conventional wires become very lossy in the tens of GHz).

In view of the above, it in an object of the present invention to provide a plasmonic transistor that allows for control of the propagation of surface plasmons. Another object of the present invention is to provide a plasmonic transistor that does not require the surface plasmon to be sustained over a long distance (i.e. on the order of a cm or more). This overcomes the loss requirements because the surface plasmon need only exist over a small region through which it may be switched between two states and subsequently detected. Yet another object of the present invention to provide a plasmonic transistor, wherein the surface plasmon wavelength is shorter than light, so that the effective active area of the device can be smaller than the wavelength of light. Still another object of the present invention is to provide a plasmonic transistor that can be fabricated using existing complementary metal-oxide-semiconductor (CMOS) technology. Another object of the invention is to provide a plasmonic transistor wherein the surface plasmon operational wavelength is close to current industry on-chip interconnect wavelengths.

SUMMARY OF THE INVENTION

A plasmonic transistor device in accordance with several embodiments of the present invention includes an electro-optic substrate and a first conductive layer placed on said electro-optic substrate to establish an interface therebetween. The first conductive layer and electro-optics substrate are made of materials that are suitable for transmission of a surface plasmon along the interface. As such, the first conductive layer can be made of a highly conductive metal, such as Ag, Au, Al or Rh, while the electro-optic substrate can be made of dielectric materials such as lithium niobate ($LiNbO_3$), strontium barium niobate (SBN), lead zirconate tantalate (PZT), lanthanum doped lead zirconate tantalate (PLZT), zinc oxide (ZnO), and potassium dihydrogen phosphate (KDP), or any other material having a permittivity that allows for selective propagation of surface plasmons along the interface.

A plurality of grooves can be formed in the conductive layer to establish an input grating coupler and an output grating coupler, and the plasmonic device can include a light source to illuminate said input grating coupler to establish said surface plasmon at said interface. Alternatively, a prism can be formed on, or optically coupled to, said conductive layer, and the light source can illuminate the prism to establish the surface plasmon at the substrate/conductive layer interface.

The plasmonics transistor according to several embodiments of the present invention further includes a means for varying the electro-optic substrate permittivity, which is connected to said electro-optic substrate. The varying means can increase (or decrease) the electro-optic substrate permittivity to allow (or inhibit) the propagation of said surface plasmon propagating along said interface. Thus, the device can function as a transistor, wherein the varying means functions as a gate, to allow a surface plasmon that has formed at the source input grating to propagate along the interface to the drain output grating. The varying means can be a light source or a voltage source.

The plasmonic transistor can further include additional conductive layers that are placed on the electro-optic substrate. For these configurations, when the additional conductive layer is made from a different material than the original conductive layer, a distinct additional interface is formed, and surface plasmons can form and propagate at the additional interface under different conditions than for the original interface. For this configuration, the varying means can manipulate the permittivity of the electro-optic substrate to allow selective propagation along one interface, while inhibiting propagation along the other interface.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

In brief overview, plasmonics is a field where one exploits the short wavelength of a surface plasmon in an analogous method as one exploits an optical wavelength for information transfer or data manipulation. But rather than a quantum of light (a photon), a plasmon or collective excitation in the electron density is used.

Figure 1:
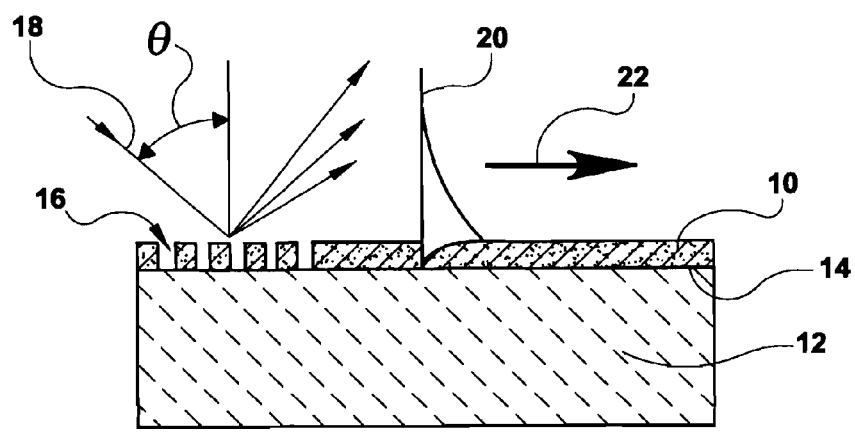
FIG. 1 is a greatly enlarged cross-sectional view of a dielectric electro-substrate and a conductive layer that shows the manner in which a grating can establish a surface plasmon at the substrate/conductive layer interface.
Figure 2:
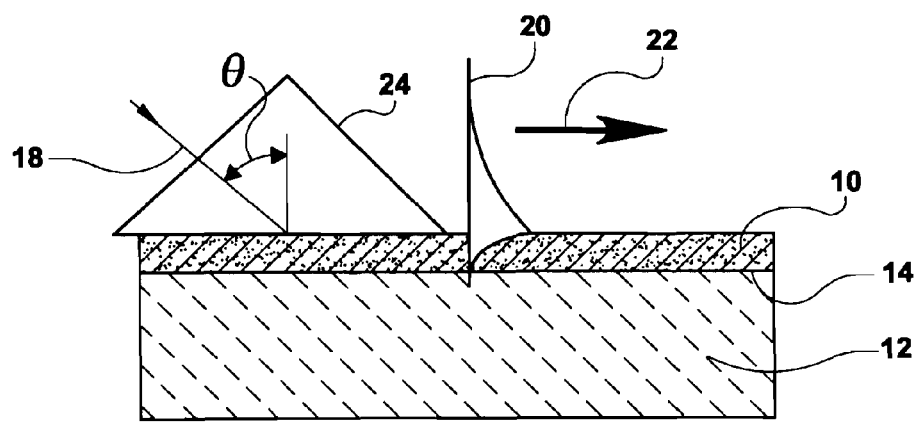
FIG. 2 is the same view as FIG. 1, but with a prism used to establish the surface plasmon instead of a grating.

To establish a surface plasmon, and referring initially to FIGS. 1 and 2, a conductive layer 10 is placed on an electro-optic substrate 12 to establish an interface 14. One may couple light 18 from light source 19 into the thin conductive layer 10 to form a surface plasmon 20 (surface plasmon 20 is not to scale in FIGS. 1 and 2), which travels along interface 14 in the direction of arrow 22 under specific coupling conditions. These coupling conditions are given by Equation [1]:

$$k_{sp} = k\left(\frac{\varepsilon_m \varepsilon_d}{\varepsilon_m + \varepsilon_d}\right)^{1/2} = \frac{\omega}{c}\sqrt{\varepsilon_d}\sin\theta \qquad [1]$$

Where $k_{sp}$ is the surface plasmon wave-vector, k is the wave-vector of the incident radiation, $\varepsilon_m$ is the permittivity of the conductive layer (for purposes of this disclosure, permittivity is defined as the ability to transmit, or "permit" an electric field), $\varepsilon_d$ is the permittivity of the electro-optic substrate, ω is the frequency at which coupling conditions occur and surface plasmon will propagate along interface 14, c is the speed of light and θ the angle (from vertical) at which coupling conditions will occur when light 18 impinges on the conductive layer.

There are well known methods of accomplishing this coupling of light 18 into conductive layer 10. For example, a plurality of grooves 16 can be formed in the conductive layer 10 as known in the art and as shown in FIG. 1. Alternatively, the coupling of light 18 could be accomplished using a high index prism 24 that is placed on conductive layer 10 to establish surface plasmon 20, as shown in FIG. 2. Other means that are known in the art include establishing an aperture coupling. See for example, U.S. Pat. No. 6,646,782, which issued to Russell et al. for an invention entitled "Solid State Surface Plasmon Light Valve and Tunable Filter", and which is assigned to the same assignee as the present invention, where this is described for a tunable optical filter.

As yet another alternative for the coupling of light 18 into conductive layer 10, one may choose to integrate a light source 19 onto the plasmonic device for effective coupling using photonic silicon devices such as Russell et al., U.S. Pat. No. 6,093,941 entitled "Photonic Silicon on a Transparent Substrate" (25 Jul. 2000), or other semiconductor or organic light emitting structures or nanostructures. Alternately externally formed and operably coupled photonic devices may be integrated in a common package to the plasmonic device.

As can be seen by Equation [1], by varying permittivity of the electro-optic substrate, the resonance and propagation of the surface plasmon can be inhibited or encouraged, according to the needs of the user.

Figure 3:
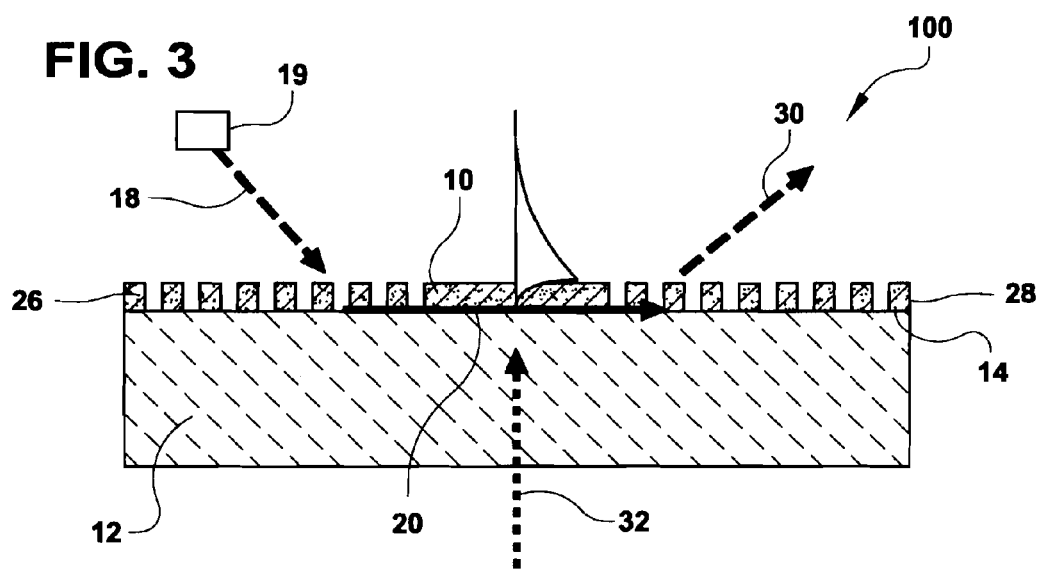
FIG. 3 is a cross-sectional view of the plasmonic transistor according to several embodiments of the present invention, with a grating used to establish the surface plasmon and a light source shown as the means for varying the electro-substrate permittivity.

This invention describes a high speed three terminal plasmonic device analogous to a transistor. Referring now to FIG. 3, the plasmonic transistor 100 according to several embodiments of the present invention is shown. As shown in FIG. 3, and as mentioned above, a suitably patterned highly conductive layer 10 is placed on a suitable electro-optic substrate 12 to establish an interface 14, which is capable of supporting surface plasmon 20. The patterned conductive layer can be thought of as the effective "waveguide" for the surface plasmon. The conductive layer 10 has a plurality of grooves formed therein to establish an input coupling region 26 for incoming signal light 18 (analogous to the source in a transistor) and an output coupling region 28 for outgoing signal light 30, which is analogous to the drain of a transistor. The portion of the conductive layer 10 between input coupling region 26 and output coupling region 28 through which the surface plasmon propagates at interface 14 is analogous to the channel of a transistor.

To function as a plasmonic transistor, the device according to several embodiments of the present invention requires a third terminal to act as a transistor gate, i.e., to control the formation and propagation of surface plasmon 20 along interface 14. Recall that the permittivity of electro-optic substrate 12 can be manipulated to control the propagation of surface plasmons 20 along interface 14. To do this, a means for varying the electro-optic substrate 32 can be operably connected to the electro-optic substrate 12. In one embodiment, and as shown in FIG. 3, the varying means can be a pulsed light source 32 of a suitable wavelength can be absorbed in the electro-optic substrate to change the electro-optic properties. For this embodiment, the pulsed light source.

Figure 4:
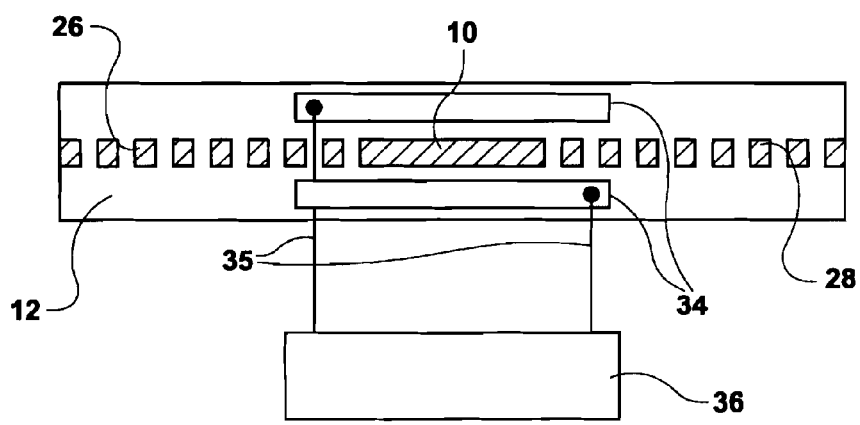
FIG. 4 is a top plan view of the plasmonic transistor shown in FIG. 3, but with a voltage source illustrated in lieu of a light source as the varying means.

There are other manners in which the varying means can affect the permittivity of electro-optic substrate. Specifically, and referring to FIG. 4, the electro-optic substrate may also have control electrodes 34 appropriately placed on or operably coupled to the substrate. The control electrodes may be in a parallel configuration, adjacent configuration or operably coupled configuration with respect to the conductive layer that supports the plasmon. The control electrodes can be connected to voltage source 36 by control lines 35. By applying a voltage to the control electrodes one can vary the electro-optic properties of the substrate and therefore change the resonance frequency of the surface plasmon.

Additionally, one or more of the control electrodes may be connected to a photodetector such as a photodiode or phototransistor so that a high speed light pulse can generate a high speed voltage pulse to form voltage source 36 to vary the electro-substrate permittivity, and thereby control the plasmonic device.

For several embodiments of the invention, the plasmonic transistor 100, can be in a normally-on configuration (with surface plasmons 20 propagating along interface 14). For these embodiments, the electro-substrate permittivity can be manipulated to change the permittivity to "turn off", or inhibit, the propagation of surface plasmon 20. In yet other embodiments, the plasmonic transistor 100 would be in a normally-off configuration and the varying means would manipulate the electro-substrate permittivity to increase the permittivity and "turn on", or encourage, the propagation of surface plasmons 20 along interface 14. Therefore the plasmonic transistor according to several embodiments of the invention can act as a switch, analogous to a transistor, and can produce a logic zero or logic one.

Figure 5:
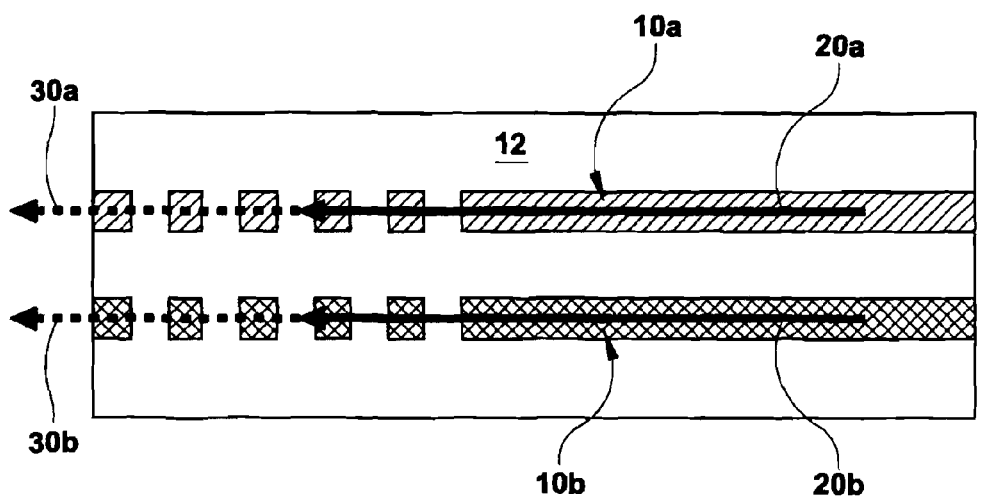
FIG. 5 is a top plan view of the output coupler region of the plasmonic transistor shown in FIG. 3, but with multiple conductive layers placed on the electro-optic substrate, to allow for selective propagation of surface plasmons at different frequencies; and, FIG. 6 is a block diagram that illustrates the steps of performing the methods according to several embodiments of the invention.

Referring now to FIG. 5, another embodiment uses suitable patterning of multiple conductive layers 10a, 10b regions that can direct support and allow coupling of light for formation of respective surface plasmons 20a, 20b at specific frequencies. In FIG. 5, conductive layer 10b can be made of a silver (Ag) material, which allows for propagation of surface plasmon 20b at resonant frequency $\omega_1$ and wherein the output light is transmitted at a 1.5 μm wavelength. On the same electro-optic substrate 12, conductive layer 10a can be made of an aluminum (Al) material. For conductive layer 10a, surface plasmon 20a forms at a different resonant frequency and propagates in an aluminum layer, and the output light is transmitted at a 0.5 μm wavelength. Similar to the above description, one can control which output will be obtained by changing the resonant frequency of the surface plasmon by varying the permitivty of the electro-optic substrate 12 through the use of a pulsed light source of a suitable wavelength absorbed in the electro-optic substrate to change the electro-optic properties; a voltage source connected to control electrodes to vary the permittivity of the electro-optic substrate; or where the above voltage source is formed by a photodetector such as a photodiode or phototransistor so that a high speed light pulse can generate a high speed voltage pulse to vary the electro-substrate permittivity, and thereby control the plasmonic device as described above.

Also, there may be confinement structures using photonic bandgap technology incorporated, as desired, to improve isolation between plasmonic devices to avoid "cross-talk" or unintended switching of adjacent devices. According, it may be desirable to space the conductive regions so that there is a dielectric spacing between them.

For the materials according to several embodiments of the present invention, Al, Au, Rh, Al, metal alloys and other highly conductive materials can be used to support the propagation of the surface plasmon. There are typically advantages for using conductive metals that will produce a narrow plasmon resonance such as Ag, since one can switch between the digital one and zero state easily. But Rh—Al, which has a broadband resonance may be able to produce an analog output (by varying intensity) rather than a digital response. One could in principle form mixed-signal (analog and digital) plasmonic devices on the same substrate by patterning different conductive layers. An analogous construction can also be made for complementary plasmonic transistor devices, where one could turn off one device and one turn on another like CMOS for an energy efficient plasmonic circuit architecture.

For materials of the electro-optic substrate, lithium niobate (LiNbO$_3$), strontium barium niobate (SBN), lead zirconate tantalate (PZT), lanthanum doped lead zirconate tantalate (PLZT), zinc oxide (ZnO), potassium dihydrogen phosphate (KDP), and the like which includes electro-optic ceramics with the titanate, tantalate, zirconate compositions and also electro-optic polymers and polymer gelatins. The substrates may also be composed of a concatenation of layers, and therefore may also include electro-optic liquid crystals confined between other layers. Wavelength range can be selected from: visible wavelengths, near-infrared wavelengths.

Figure 6:
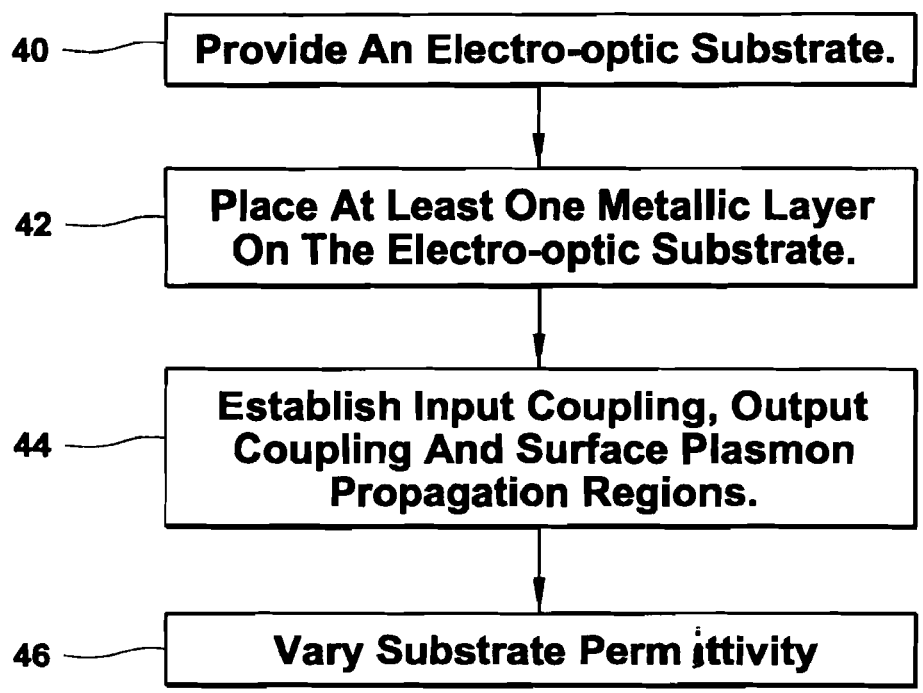

FIG. 6 schematically describes the fabrication methods according to several embodiments of the present invention. According to FIG. 6, the methods can include the step of providing an electro-optic substrate, as indicated by block 40 in FIG. 6. The methods can further include the step of forming at least one conductive layer on the electro-optic substrate to establish the above-cited interface for propagation of surface plasmons, as indicated by block 42 in FIG. 6. To form the surface plasmon, the method according to the present invention can further include the step of establishing an input coupling and output coupling region in the conductive layer, as shown by block 44. This step could be accomplished by grating the conductive layer, by forming or optically coupling a prism onto the conductive layer, or by actually fully integrating a light source into the plasmonic transistor, as mentioned above.

The methods according to several embodiments of the present invention can further include the step of varying the permittivity of the electro-optic substrate, as shown in block 46. The varying step can be accomplishing for providing control voltage via a voltage source that is connected to the electro-optic substrate via electrodes, as described above. Alternatively, the varying step could be accomplished using a control light source which selectively illuminates the electro-optic substrate to varying the permittivity as desired by the operator. Or, a combination of light and voltage could be used to vary the electro-optic substrate permittivity, by connecting a photodiode to electrodes, which are further operably connected to the substrate.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device comprising:
    an electro-optic substrate having a permittivity;
    a first conductive layer placed on said electro-optic substrate to establish an interface therebetween for transmission of a surface plasmon, said first conductive layer having a first plurality of grooves and a second plurality of grooves formed therein, said first plurality and said second plurality being spaced-apart to establish an input coupling region and an output coupling region in said interface, and a gate region in said interface therebetween; and, a means for varying said permittivity in direct contact with said electro-optic substrate for selective propagation of said surface plasmon along said interface.

2. The device of claim 1 further comprising:

a light source illuminating said first conductive layer to establish said surface plasmon at said interface within said input coupling region.

3. The device of claim 1 further comprising:

a prism placed on said conductive layer; and, a light source illuminating said prism to establish said surface plasmon at said interface within said input coupling region.

4. The device of claim 1 wherein said varying means includes a light source.

5. The device of claim 1 wherein said varying means includes a voltage source.

6. The device of claim 1 wherein said first conductive layer establishes a first interface, and further comprising:

a second conductive layer placed on said electro-optic substrate spaced-apart from said first conductive layer, said conductive layer establishing a second interface, said second interface being co-planar with said first interface, said second conductive layer having a third plurality of grooves and a fourth plurality of grooves formed therein, said third plurality and said fourth plurality being spaced-apart to establish an input coupling region, a gate region and an output grating coupling along said second interface; and, said varying means selectively inhibiting the propagation of said surface plasmon along one of said interfaces while selectively allowing the propagation of said surface plasmon along the other of said interfaces.

7. The device of claim 6 wherein said first conductive layer is made of a material selecting from the group consisting of Ag, Au, Al or Rh.

8. The device of claim 7 wherein said second conductive layer is made of a Rh—Al alloy.

9. A surface plasmon transistor comprising:

an electro-optic substrate having a gate permittivity;

a first conductive layer placed on said electro-optic substrate to define an interface;

said first conductive layer being formed with a first plurality of grooves and a second plurality of grooves, said first plurality and said second plurality being spaced-apart to define a source region, a drain region and a gate region therebetween along said interface; and, a control source in direct contact with said electro-optic substrate, said control source selectively manipulating said gate permittivity to allow selective propagation of a surface plasmon along said interface from said source grating to said drain grating.

10. The surface plasmon transistor of claim 9 further comprising:

a light source illuminating said source grating to establish said surface plasmon within said source region.

11. The device of claim 9 further comprising:

a prism placed on said first conductive layer; and, a light source illuminating said prism to establish said surface plasmon at said interface within said source region.

12. The device of claim 9 wherein said control source includes a light source.

13. The device of claim 9 wherein said control source includes a voltage source.

14. The device of claim 9 wherein said first conductive layer establishes a first interface, and further comprising:

a second conductive layer placed on said electro-optic substrate spaced-apart from said first conductive layer, said second conductive layer establishing a second conductive interface that is co-planar with said first interface, said second conductive layer having a third plurality of grooves and a fourth plurality of grooves, said third plurality and said fourth plurality being spaced-apart to define a source region, a drain region and a gate region therebetween for said second interface; and, said control means selectively inhibiting the transmission of said surface plasmon along one of said conductive interfaces while selectively allowing the transmission of said surface plasmon along the other of said conductive interfaces.

15. The device of claim 14 wherein said first conductive layer is made of a material selecting from the group consisting of Ag, Au, Al or Rh.

16. The device of claim 15 wherein said second conductive layer is made of a Rh—Al alloy.

17. The device of claim 9 wherein said electro-optic substrate is made of a material selected from the group consisting of lithium niobate ($LiNbO_3$), strontium barium niobate (SBN), lead zirconate tantalate (PZT), lanthanum doped lead zirconate tantalate (PLZT), zinc oxide (ZnO), and potassium dihydrogen phosphate (KDP).

\* \* \* \* \*